Figure 1:
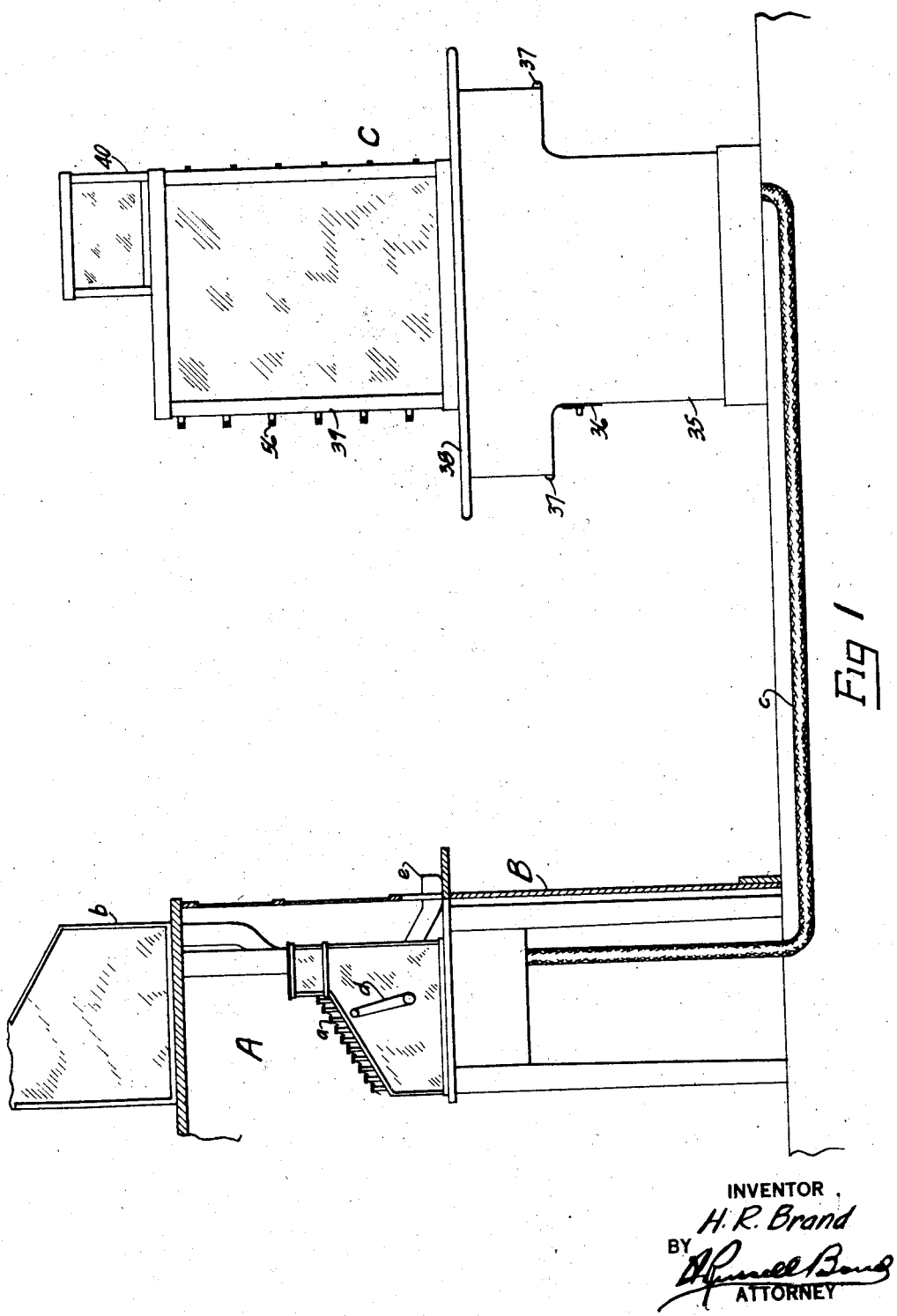

Aug. 16, 1932.  H. R. BRAND  1,872,110
DISPENSING APPARATUS
Filed July 8, 1927   13 Sheets-Sheet 3

INVENTOR
H. R. Brand
BY
Russell Bond
ATTORNEY

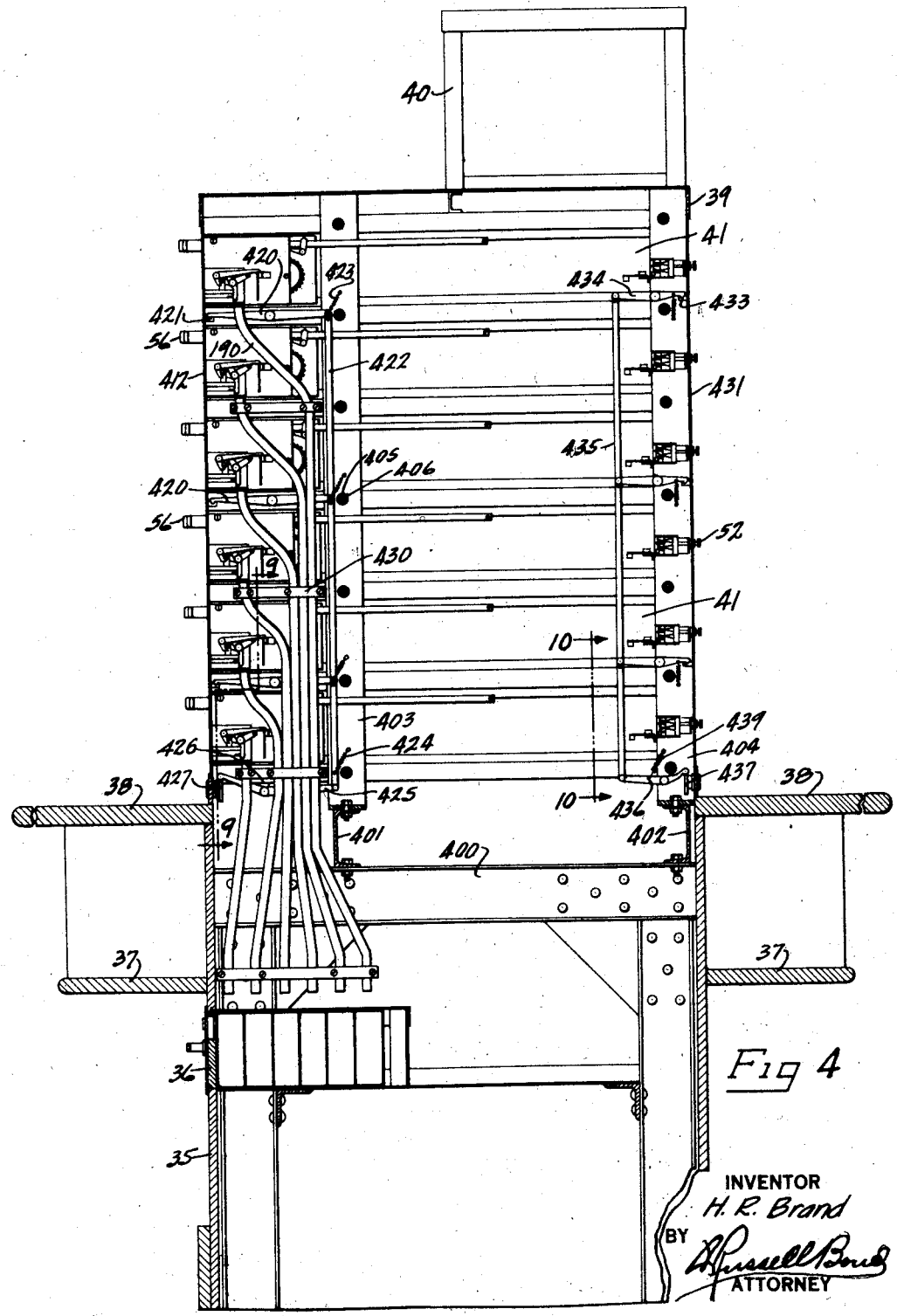

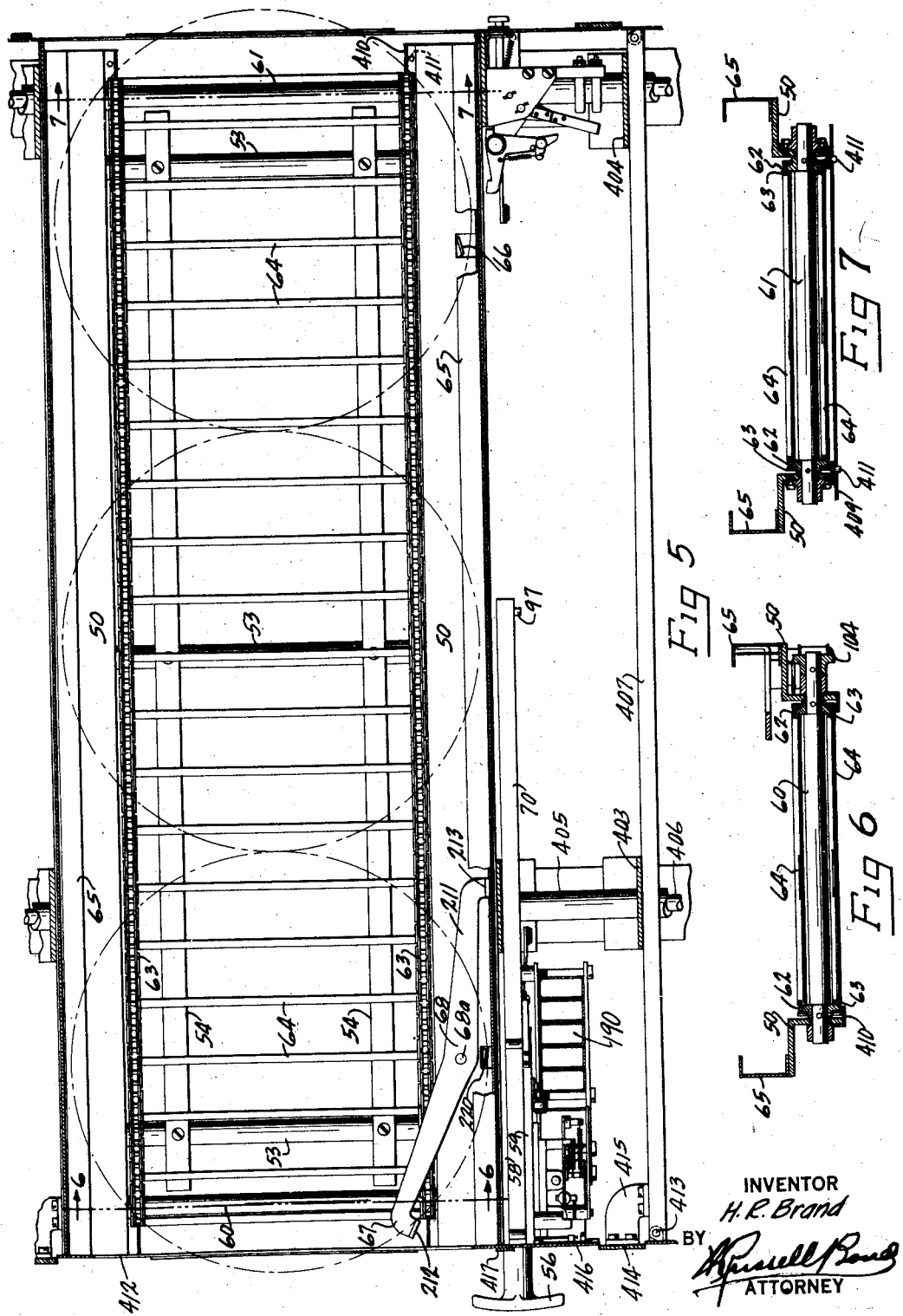

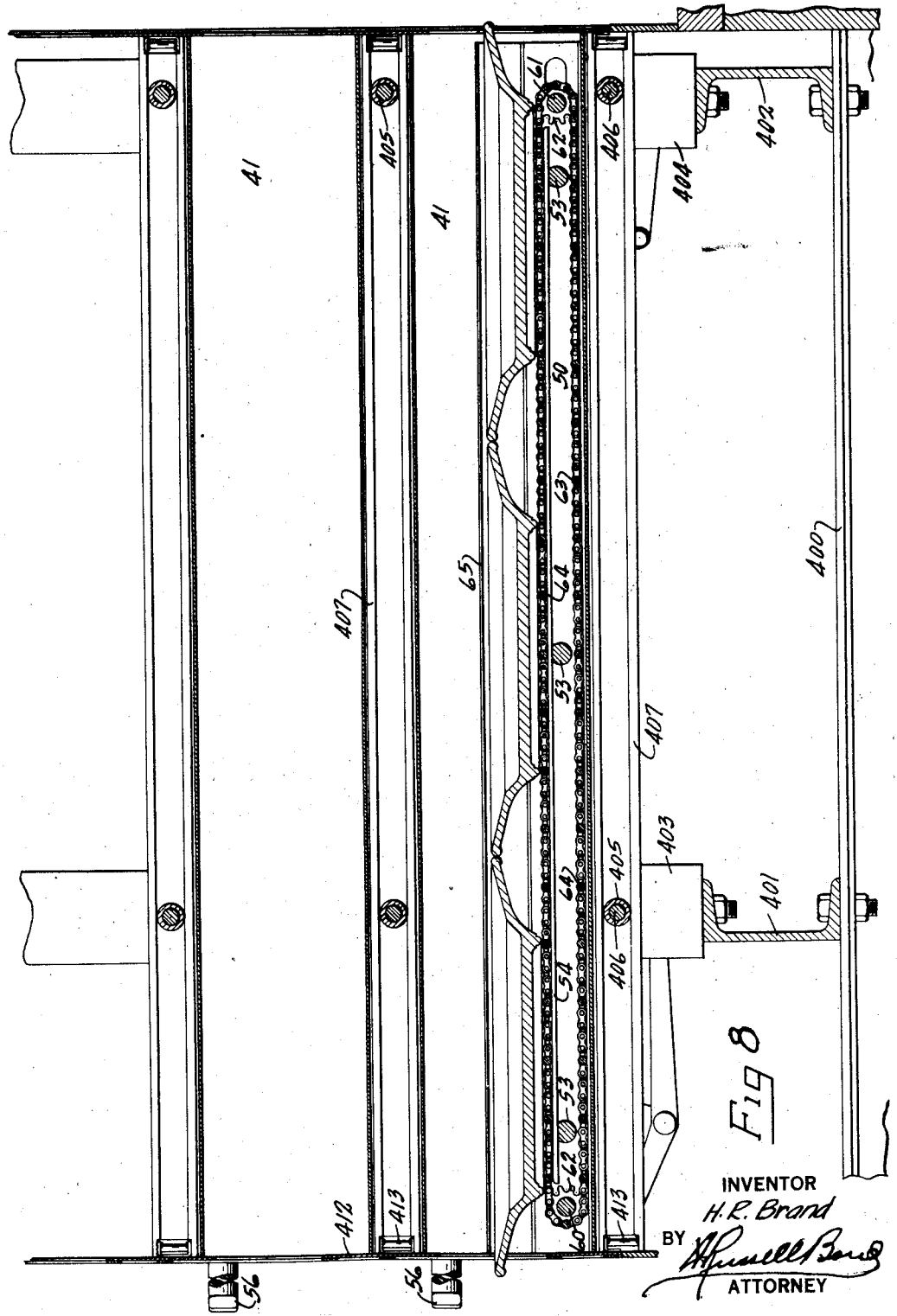

Aug. 16, 1932.    H. R. BRAND    1,872,110
DISPENSING APPARATUS
Filed July 8, 1927    13 Sheets-Sheet 7

INVENTOR
H. R. Brand
BY
ATTORNEY

Aug. 16, 1932.  H. R. BRAND  1,872,110
DISPENSING APPARATUS
Filed July 8, 1927  13 Sheets-Sheet 8
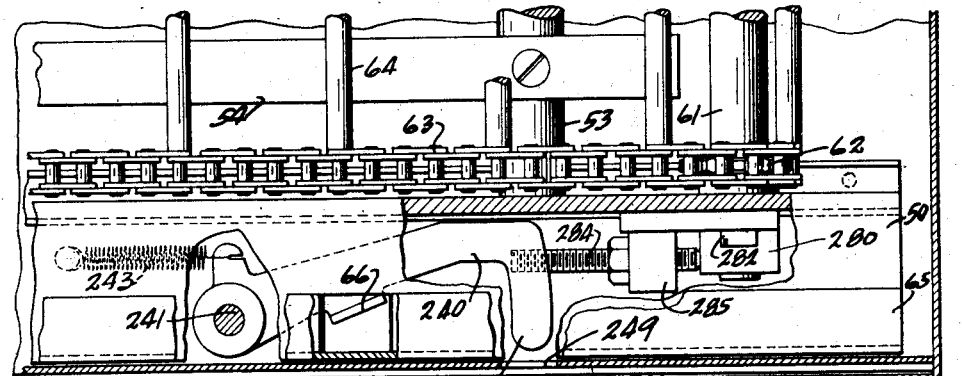
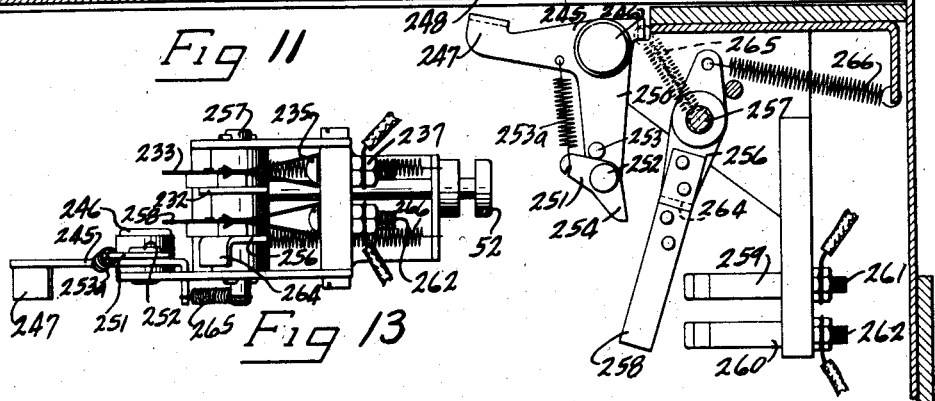
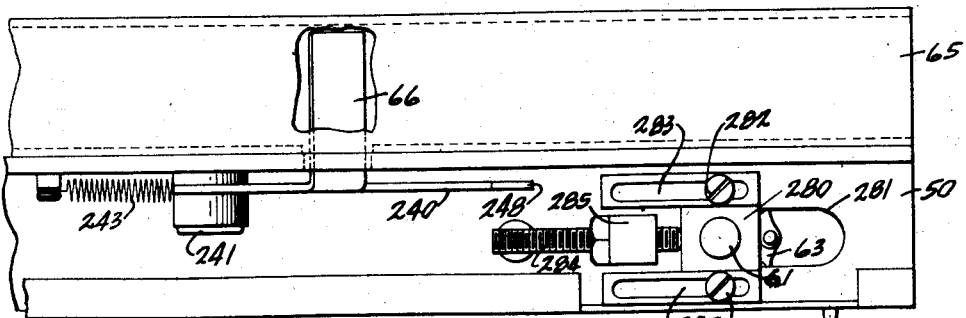
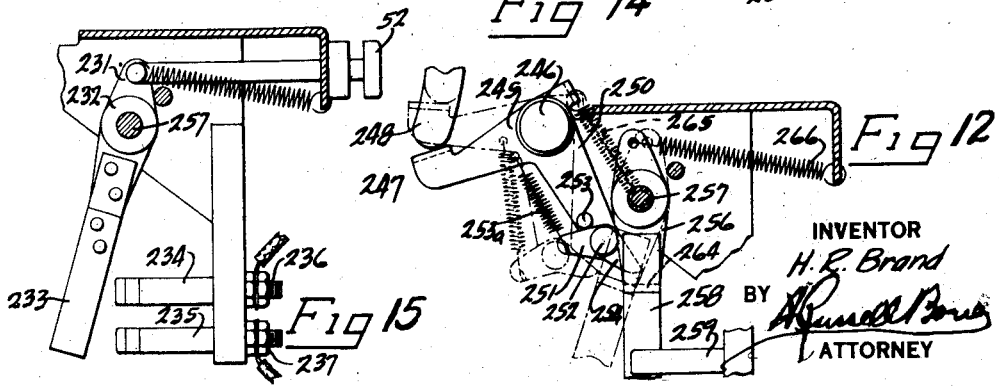
INVENTOR
H. R. Brand
BY
ATTORNEY Aug. 16, 1932.                H. R. BRAND                1,872,110
DISPENSING APPARATUS
Filed July 8, 1927          13 Sheets-Sheet 9

INVENTOR
H. R. Brand
BY
ATTORNEY

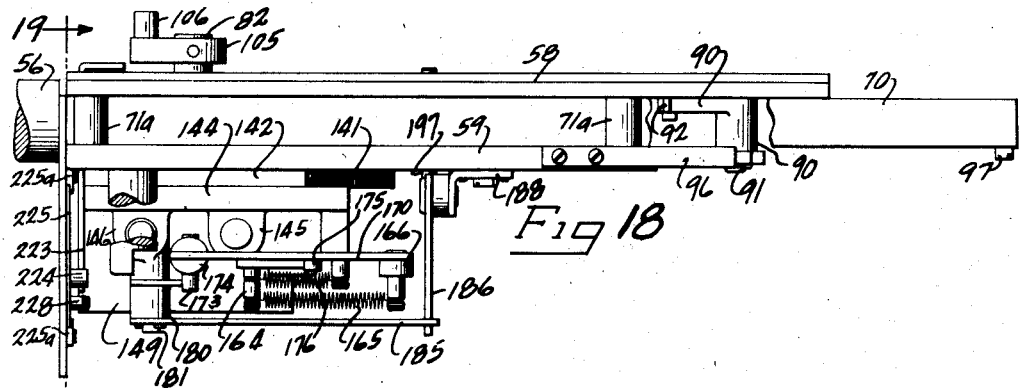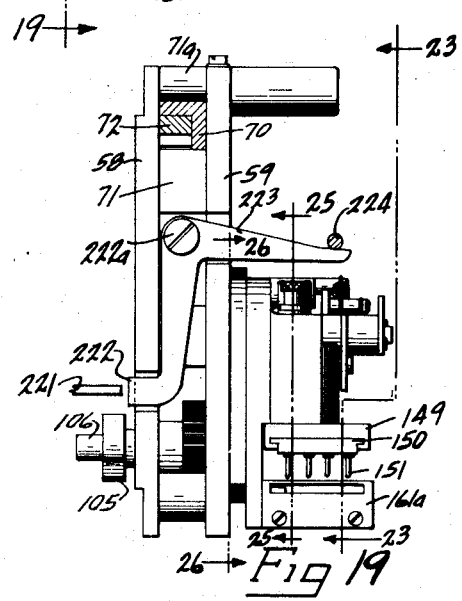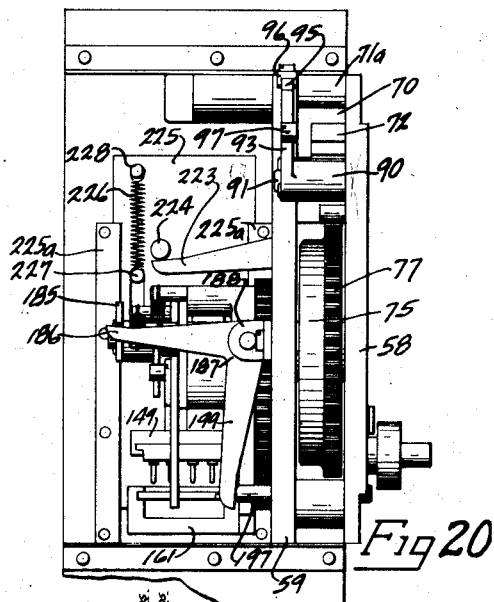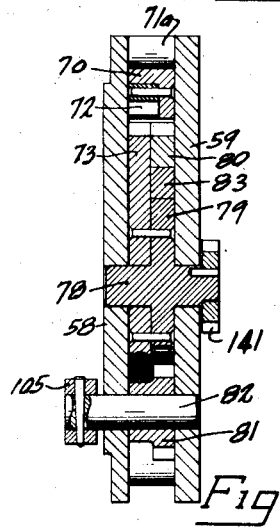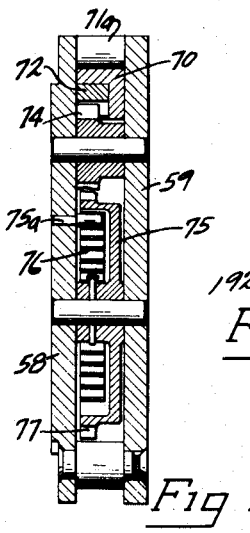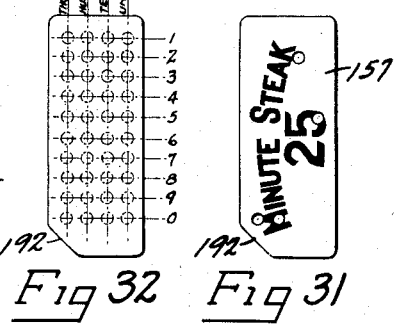

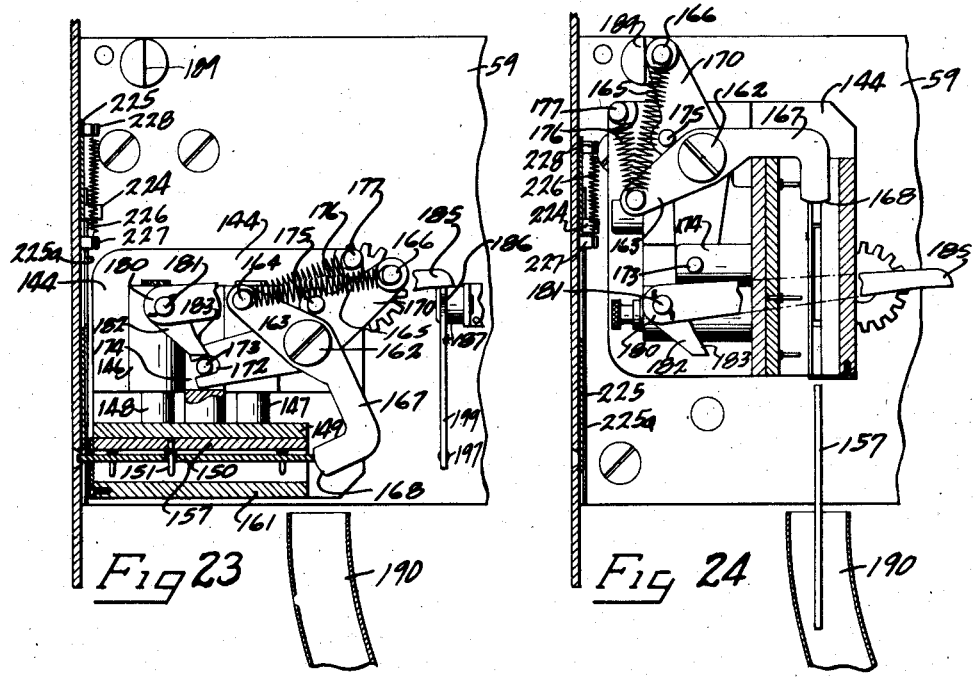
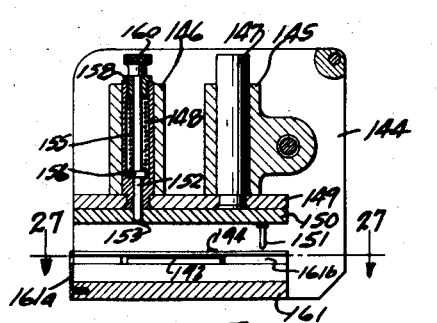
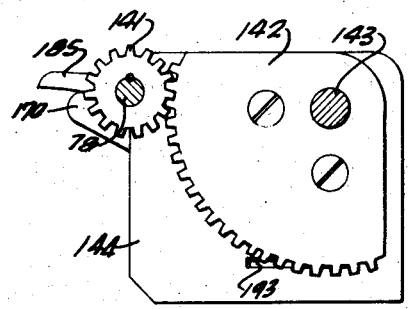
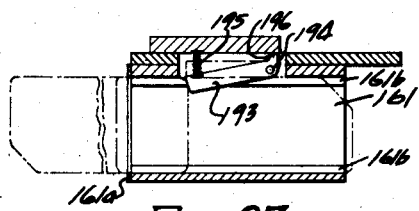
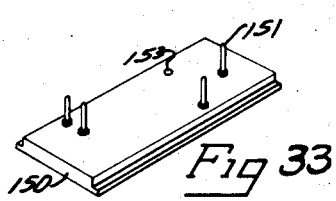

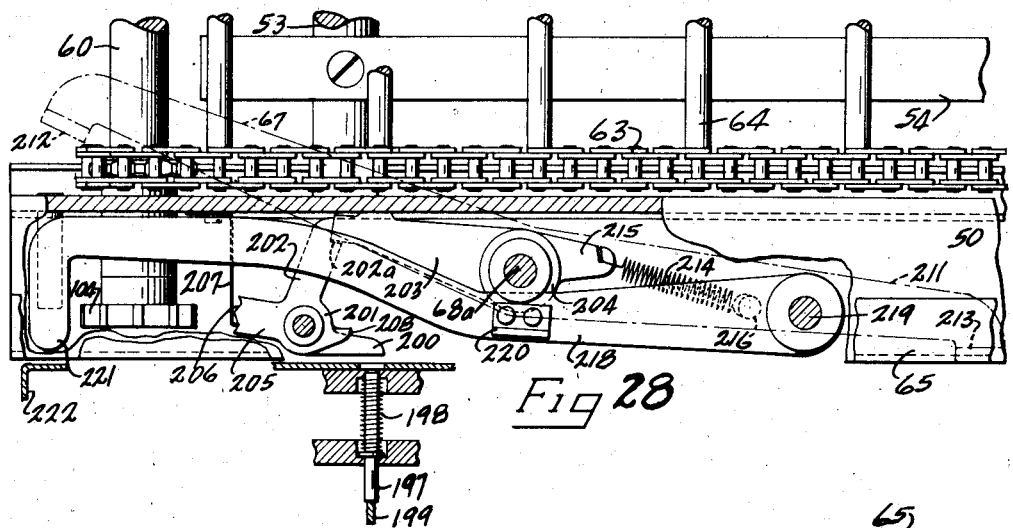
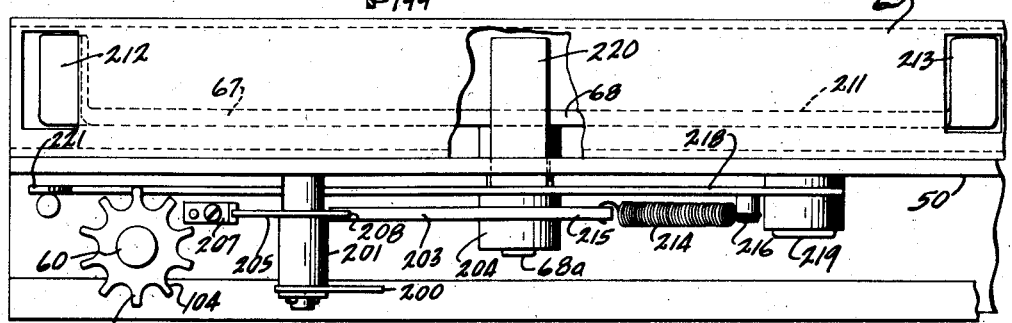
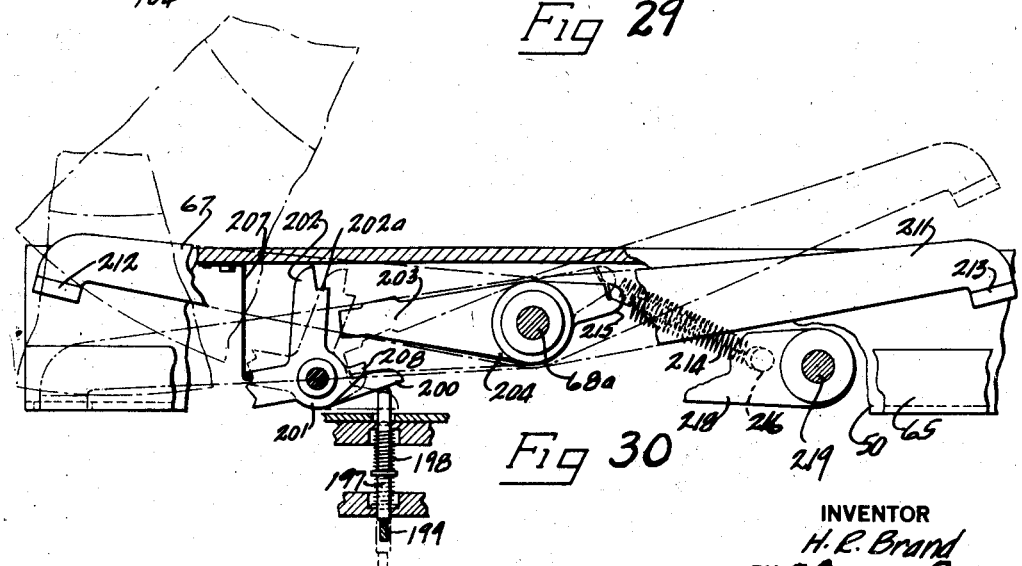

Aug. 16, 1932.  H. R. BRAND  1,872,110
DISPENSING APPARATUS
Filed July 8, 1927  13 Sheets-Sheet 13

INVENTOR
H. R. Brand
BY
ATTORNEY

Patented Aug. 16, 1932

1,872,110

UNITED STATES PATENT OFFICE

HARRY RUSSELL BRAND, OF NEW YORK, N. Y.

DISPENSING APPARATUS

Application filed July 8, 1927. Serial No. 204,325.

My invention relates to apparatus for dispensing various articles or commodities and particularly to dispensing apparatus adapted to be selectively controlled by means of tokens.

My invention has for a specific object to provide apparatus which may be used in such an establishment, for instance, as a restaurant, to control the dispensing of food in accordance with orders given to a cashier and paid for on placing the order. To this end the cashier is provided with a token delivering machine which may be of the type described in my co-pending application, Serial No. 191,805, filed May 16, 1927. As the customer or a waiter places an order the cashier depresses keys corresponding respectively to the different items ordered and as each key is depressed a corresponding token is uttered, and corresponding signals are transmitted to a serving station informing the chef or server what commodities and how many of each kind have been ordered. At the service station is located a serving machine, in one side of which the server places the commodities as ordered or as soon as he is able to fill the order. There is a separate compartment for each kind of commodity and at the waiter's or customer's side of the machine there is a latch in each compartment to prevent removal of the commodities placed therein by the server. The customer may unlock the latch by inserting a corresponding token in the token slots associated therewith, so that he may take out the commodity which he has purchased.

An object of my invention is to provide a serving machine provided with compartments, in each of which one or more commodities may be placed, mechanism being provided for releasing only one of the commodities at each insertion of a proper token.

Another object is to provide means for preventing the insertion of a token unless there is a commodity in the compartment.

Another object of the invention is to provide means for rejecting a token if inserted in the wrong token slot.

Another object of the invention is to provide means for retaining the proper token and depositing it in a locked receptacle accessible to an authorized person only.

Another object of the invention is to provide a serving machine provided with a plurality of compartments each having an annunciator operated from a remote point to notify the server as to the kind and number of each commodity, said annunciator being set back manually by the server in acknowledgment of the receipt of the order.

Another object of the invention is to provide a serving machine with a plurality of compartments each having a double dialed annunciator controlled from a remote point to indicate the number of orders for each commodity placed, one dial of said annunciator being automatically set back as each commodity is introduced into the compartment by the server.

It will be clear from the above general description of my dispensing apparatus and from the objects of my invention above noted that my invention includes not only a serving machine but the combination of such a machine with apparatus controlled from a remote point, such for example as a token-delivering and signalling machine operated from a cashier's station.

With the above noted objects in view and other objects which will appear hereinafter, my invention consists in various features and combinations and arrangements of parts which will be fully described in connection with the accompanying drawings illustrating a preferred embodiment of my invention and the novelty of my invention will be specifically pointed out and defined in the appended claims.

Figure 2:
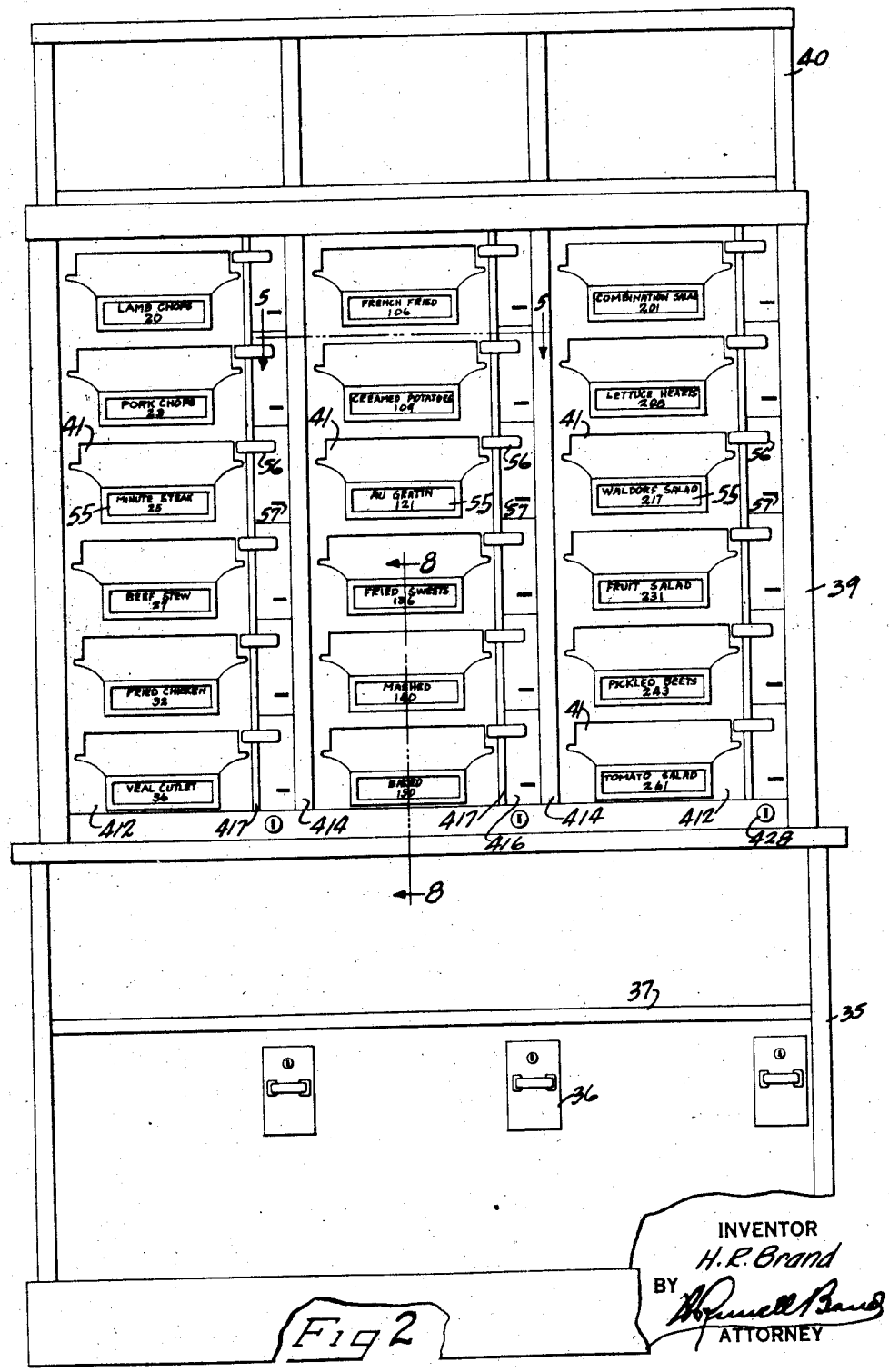
Figure 3:
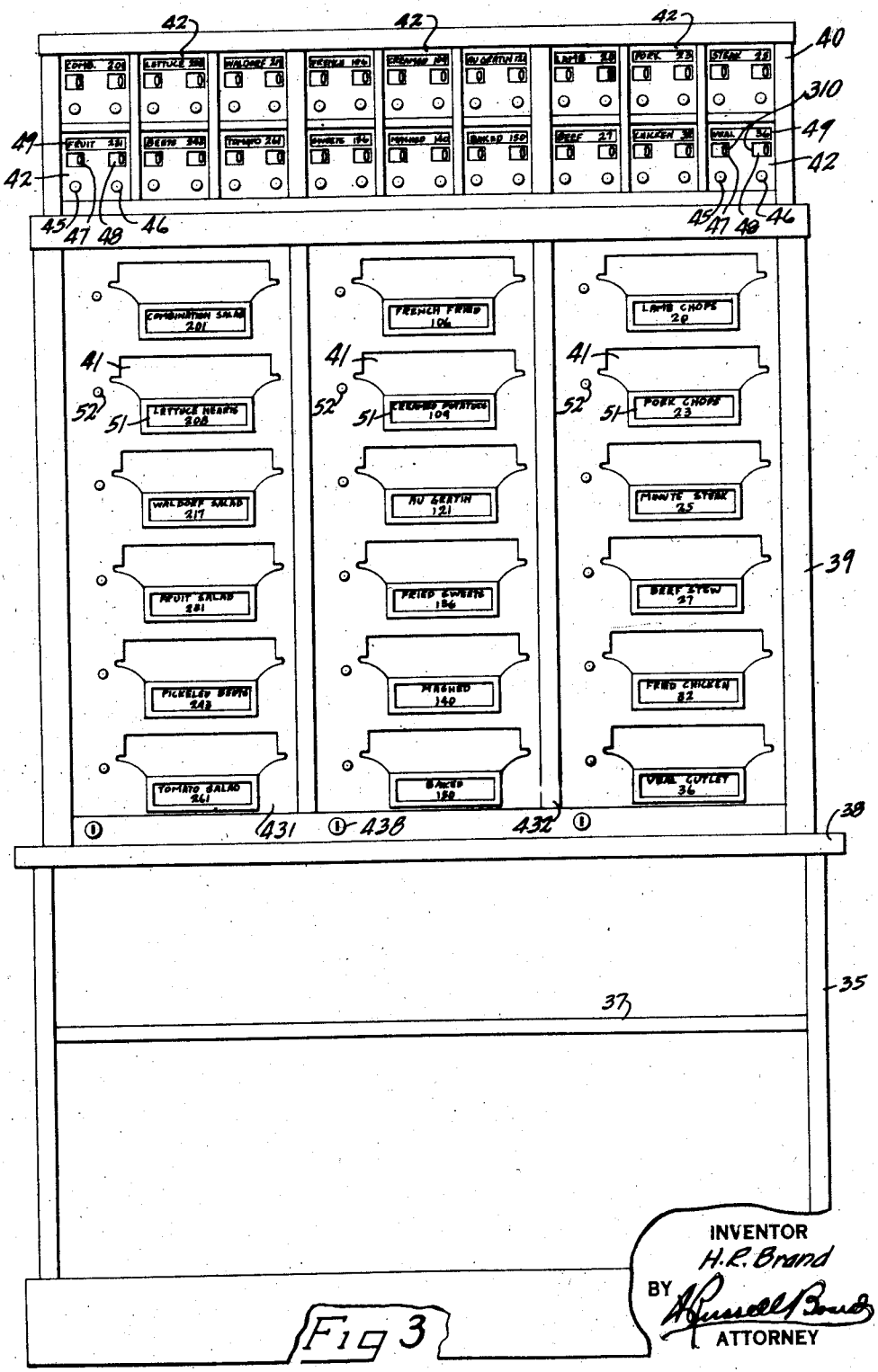
Figure 9:
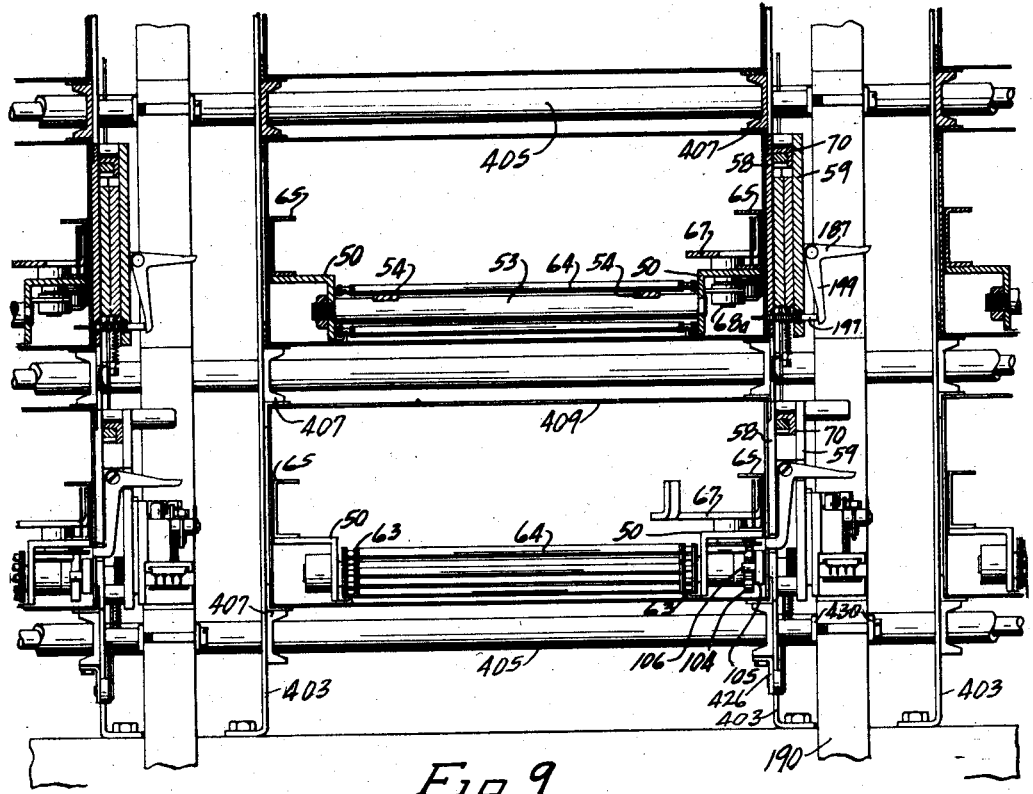
Figure 10:
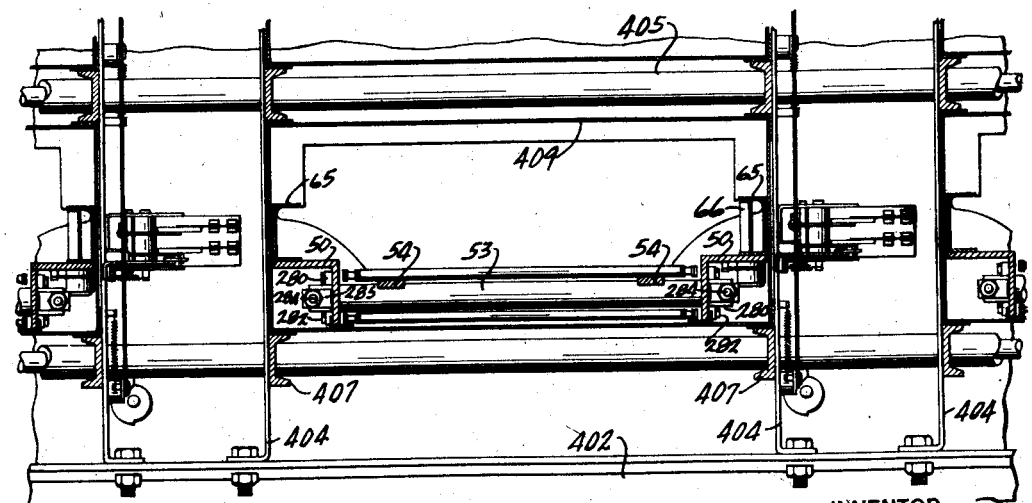
Figure 16:
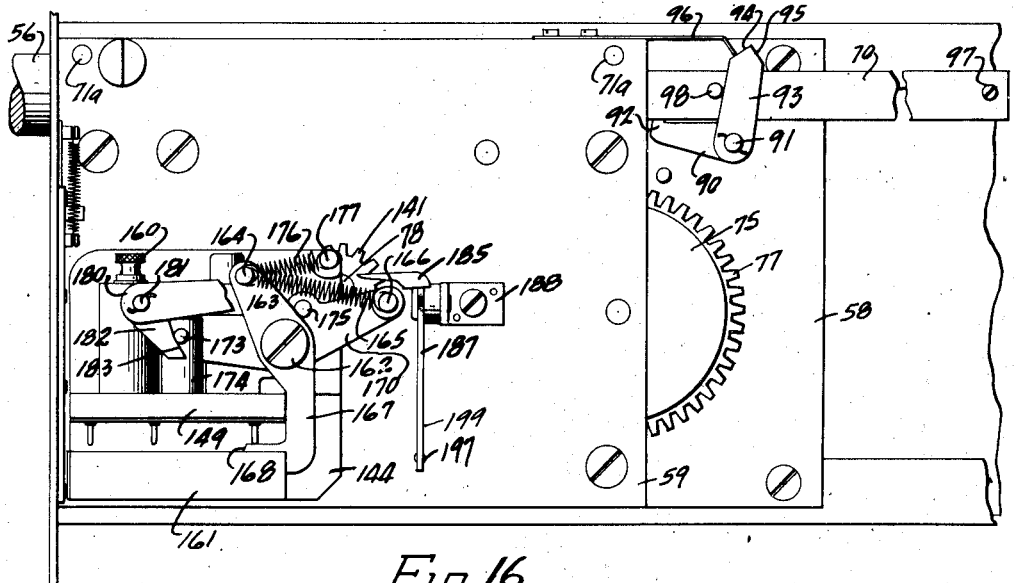
Figure 17:
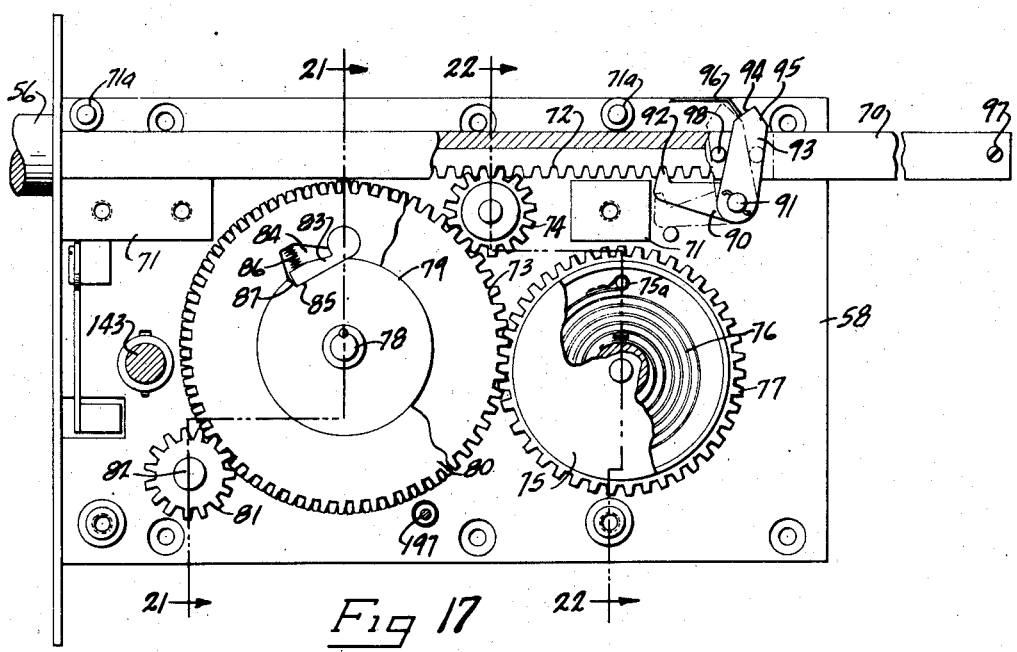
Figure 34:
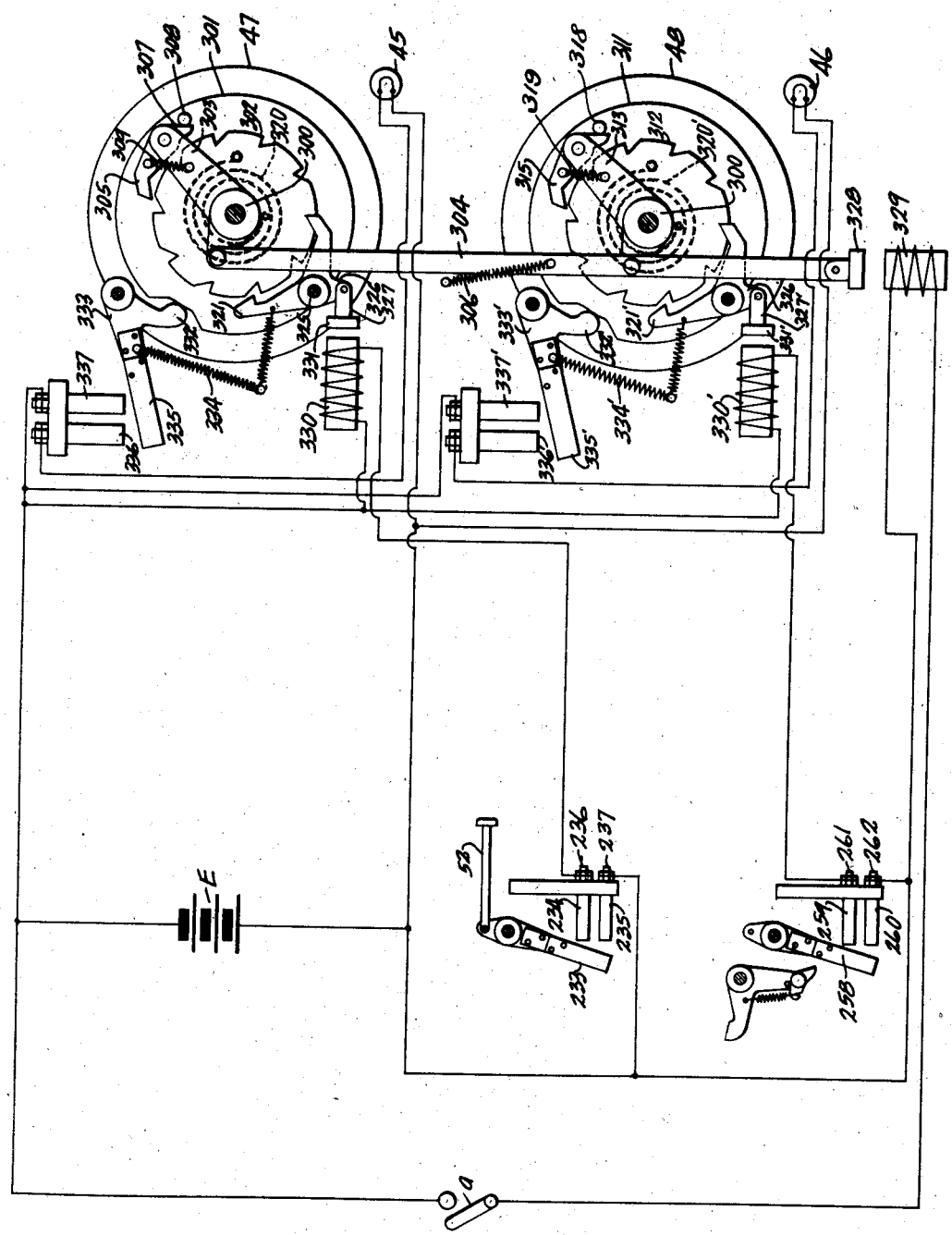

In the accompanying drawings,

Fig. 1 is a side elevation of my improved dispensing machine electrically connected to a token-delivering and signalling machine, the latter being located in a cashier's cage, a portion of which is included in the drawing, and shown in section, Fig. 2 is an end elevation of the dispensing machine as viewed from the customer's or waiter's side, Fig. 3 is a similar elevation of the dispensing machine as viewed from the server's side, Fig. 4 is a side elevation of the dispensing machine with the casing cut away to reveal interior details, Fig. 5 is a fragmental view in section taken on the line 5—5 of Fig. 2, Figs. 6 and 7 are views in cross section taken on the lines 6—6 and 7—7 respectively of Fig. 5, Fig. 8 is a fragmental view in section taken on the line 8—8 of Fig. 2, Fig. 9 is a fragmental view in cross section taken along the irregular line 9—9 of Fig. 4, Fig. 10 is a fragmental view in cross section taken along the line 10—10 of Fig. 4, Fig. 11 is a fragmental plan view of certain signal-setting mechanisms, Fig. 12 is a fragmental view of a portion of Fig. 11 with certain members in a different operative position, Fig. 13 is a fragmental side elevation of the signal-setting mechanism, Fig. 14 is a fragmental side elevation of certain mechanisms shown in Fig. 11, Fig. 15 is a fragmental plan view of a manual signal control, Fig. 16 is a side elevation in detail of certain token-controlled article-releasing mechanism, Fig. 17 is a view similar to Fig. 16 but with certain outer parts removed and certain members broken away to reveal interior details, Fig. 18 is a plan view of the mechanism shown in Fig. 16, Fig. 19 is a view in section taken on the line 19—19 of Fig. 18, Fig. 20 is an end elevation of the mechanism shown in Fig. 18 as viewed from the righthand end of the latter figure, Figs. 21 and 22 are views in section taken on the irregular lines 21—21 and 22—22 respectively of Fig. 17, Fig. 23 is a view in section taken on the line 23—23 of Fig. 19, Fig. 24 is a view similar to Fig. 23 but with certain parts in a different operative position, Fig. 25 is a view in section taken on line 25—25 of Fig. 19, Fig. 26 is a side elevation of a gear sector and associated parts, being a section taken on line 26—26 of Fig. 19, Fig. 27 is a view in section taken on line 27—27 of Fig. 25, Fig. 28 is a fragmentary plan view of the plate-releasing mechanism, Fig. 29 is a side view of the plate-releasing mechanism, Fig. 30 is a fragmental plan view of the mechanism shown in Fig. 29 but with certain members in a different operative position, Fig. 31 is a plan view of a token adapted to be used in my machine, Fig. 32 is a plan view of a token blank showing a number combination scheme controlling the arrangement of perforations formed in the token, Fig. 33 is a view in perspective of a selector plate, and Fig. 34 is a wiring diagram.

In Fig. 1 I have shown a token-delivering machine A located in a cashier's cage B and electrically connected to a serving machine C. The token delivering machine illustrated is of the type disclosed in my co-pending application above referred to and is provided with keys $a$, there being a key for each kind of commodity to be served. As each commodity is ordered by the customer the cashier or operator of the token-delivering machine depresses a corresponding key, and at each key depression a corresponding token is uttered from the magazine $b$ and simultaneously corresponding signals are transmitted to the serving machine through a cable $c$. The nature of these signals will be described hereinafter. The tokens are preferably held inaccessible in the token-delivering machine until the commodities have been paid for, when the cashier operates a handle $d$ to release the tokens and deliver them into a receptacle $e$ which projects from the cage B and is accessible to the customer.

The serving machine includes a base 35 provided with drawers 36 to receive the tokens inserted in the machine by the customer. These drawers are locked so as to be accessible to an authorized person only. The base 35 may be conveniently formed with shelves 37 and the top of the base provides a counter 38 on which is supported a casing 39 containing the serving apparatus. Mounted on the casing 39 is a casing 40 containing the annunciator apparatus.

The casing 39 carries a plurality of serving compartments 41, as will be generally seen in Figs. 2, 3 and 4. Each of the serving compartments is associated with a particular annunciator section 42 in the casing 40. These serving compartments are arranged in tiers as illustrated, the operating mechanism being in the form of standardized, interchangeable, removable units. Since the various serving compartments are all alike it will be sufficient to describe one. Thereafter, the interrelation of the different compartments will be given.

In general each serving compartment, (Figs. 5, 8, 9 and 10), comprises a horizontal passageway through the machine from front to rear, being adapted to have the article or commodity to be dispensed inserted in one end by the serving clerk, chef or steward, and to have the article removed from the other end of the passage by the waiter or customer. Thus the machine serves as a barrier between the chef and the customer.

The side of the machine illustrated in Fig. 2 will be designated as the customer's side, it being understood that the customer may be either the ultimate customer or the waiter as an intermediary. The side illustrated in Fig. 3 will be designated as the server's side, the term server being used to designate the chef or steward or whatever individual fills the orders.

It is preferred that the annunciator system for each serving compartment include a pair of signals to be set by the ordering operation, one of which may be restored to normal manually by the server in acknowledgment of the receipt of the order; the other signal being arranged to be responsive to the serving mechanism direct in acknowledgment of the service of the order. The serving mechanism is thus arranged to receive the article dispensed at one end of the serving compartment and to acknowledge this receipt by cancelling one order on the control annunciator automatically, thus completing the merchandising from the point of view of the server. The other end of the serving passageway is equipped to deliver the article to the individual for whom it has been ordered, and in the particular equipment illustrated, this comprises an arrangement whereby the machine may be opened only in response to the token ejected from the ordering machine, and delivered to the customer by the cashier as previously described.

Each serving compartment is designed for the dispensing of one kind of commodity only, and is so arranged that a plurality of each commodity (as is indicated in Fig. 5 by broken lines and in Fig. 8 by full lines) may be accommodated at one time. The individual commodities will be acknowledged as admitted and will be released, one at a time in response to the receipt of the proper token. Means are also provided whereby all of the articles within the compartment may be brought within ready reach of the customer to be removed in response to the proper token.

Before entering into the detail construction of the mechanism by which these functions are accomplished, it may be indicated generally what is the significance of the exterior features of the machine. It is intended, in general in the particular machine illustrated, that each article or commodity shall be dispensed upon a plate. The contour of the exterior openings at each end of the serving compartments, therefore, is generally shaped to receive the plate and the article upon it, as will be seen from Figs. 2 and 3.

The annunciator section 40 in general, includes as illustrated, two signal lights 45 and 46 and two corresponding dial indicators, 47 and 48. Associated with the dial indicators is a label 49 to indicate the commodity designed to be dispensed by the corresponding serving compartment. (Each label may bear in addition to the name of the food a designating number, as for instance, "Pork chops 23"). This serving compartment 41 also bears a similar designating label 51, and associated with it is a push button 52. The mechanism is so arranged that upon depression of the corresponding key *a* of the ordering or token-delivering machine, both signal lights 45 and 46, will become illuminated and both dials 47 and 48 will move forward one number to indicate one order. If the ordering key should be depressed twice, both dials will correspondingly advance to the number "2".

The lights 45 and 46 are preferably of different colors to facilitate the visual interpretation of the signals. Thus, for example, the light 45 may be green, and the light 46 may be red. One of the signal lights 45 and its corresponding dial indicator 47 are both within control of the push button 52 so that the server may restore this dial to normal and extinguish the green light by pressing the push button the number of times corresponding to the number of orders registered upon the dial. The signal light 46, however, is arranged to continue burning and the number to continue to appear upon the dial 48, until restored by the insertion of the corresponding number of commodities in the serving compartment.

Mechanism is arranged whereby the actual insertion of a plate containing the desired order in the serving compartment will automatically reduce the number upon the dial 48 by one, and when this dial has been restored to zero, to extinguish the indicator light 46.

At the customer's side of the machine, (see Fig. 2) the corresponding label 55 appears, while adjacent to the compartment is a handle 56, and a token slot 57. The interior mechanism on this side of the machine is such, that upon pulling the handle 56, any commodity within the compartment will be brought to a position of ready access, but it is not by such action alone that the commodity will be permitted to be taken from the machine, for it is still locked within the compartment by control mechanism.

The slot 57 is designed to receive the token which has been ejected from the ordering machine and the insertion of this token releases one commodity for removal. Mechanism is arranged, however, to prevent the insertion of the token in the slot until the commodity itself is in position at the customer's side of the machine, ready to be removed. Mechanism is also arranged to eject the token should a token be inserted which does not correspond to the particular commodity ordered. Thus the commodity can be removed from the customer's side of the machine only by the insertion of the proper token.

With the foregoing description of the functions of the machine, the operation of the particular mechanism provided for carrying out these operations, will be more readily understood.

The mechanisms within each individual compartment are best shown in Figs. 5 to 10 inclusive. For convenience of reference I shall refer to the customer's side of the machine as the front end and the server's side as the rear end. As seen in Figs. 5 and 8 the customer's side of the machine is at the left and the server's side at the right.

Each compartment has a conveyor frame comprising a pair of side plates 50 of angular cross section (Figs. 6 and 7). The side plates are connected by transverse spacing bars 53 and supported on these bars are supporting strips 54 running lengthwise of the frame. Journalled in the side plates at the front and rear of the frame are shafts 60 and 61 respectively, each carrying a pair of sprocket wheels 62 adapted to support a pair of chains 63 located respectively adjacent the opposite side walls of the frame. Transverse bars 64 connect these chains thus forming an endless conveyor running lengthwise of the frame. On this conveyor are placed plates bearing the commodities ordered. The bars 64 on the upper reach of the conveyor slide along the strips 54 and the conveyor is thus prevented from sagging under the weight of the plates. Side channels 65 are supported on the angle plates 50 and provide guides for the sides of the plates to maintain them centrally disposed upon the conveyor and to permit the operation of the control mechanism with the co-operation of the sides of the plate.

In general, as seen in Figs. 5, 10, 11 and 14, a yieldable projecting finger 66 is disposed in the pathway of the edge of the plate and adapted to be pushed out of place by it. It is this finger which is used to restore the indicating dial 48 and the signal light 46, as will be explained hereinafter.

At the customer's side of the machine is an arm 67 of a lever 68 which projects outwardly into the pathway of the plate in position to confine the plate within the compartment. This lever is pivoted as at 68a to the adjacent angle plate 50 of the compartment and mechanism is arranged whereby the lever is held locked in the restraining position but is released therefrom in such a manner as to permit the withdrawal of the plate when the proper token is inserted in the slot 57, as will be described later.

Referring particularly to the mechanism for operating the conveyor, the handle 56 (see Figs. 5, 16, 17 and 18) is connected to a rod 70 mounted to slide horizontally between vertical side plates 58 and 59. Guide blocks 71 fitted between the side plates serve as supports for the rod 70 and rollers 71a bear against the upper surface of the rod 70. The latter carries a rack 72 which drives a gear 73 through the medium of a pinion 74. A barrel 75 carrying a spiral spring 76 has a gear 77 (see Figs. 17, 20 and 22) meshing with the gear 73 and this spring is attached at one end to the barrel 75 and at the other end anchored to a pin 75a fixed in the side plate 58. The spring through the medium of the gear train is adapted to restore or assist in restoring the rod 70 to its retracted position, after said rod has been drawn out. A pin 78 which serves as a journal for the gear 73, (see Fig. 21) carries a disk 79 pinned to said gear. The disk 79 serves as a journal for a gear 80 which may conveniently be of the same diameter as and lying flat against the gear 73.

A pinion 81 carried by a shaft 82, meshes with the gear 80, while the shaft 82 is in operative driving relation to one of the sprockets 62 of the conveyor as will be explained presently.

The gear 80 is readily turnable upon the disk journal 79. It carries, however, a pawl 83 pivoted thereto and adapted to enter a recess 84 in the inner periphery of the gear. A corresponding recess 85 is provided upon the exterior of the disk journal 79 and a spring 86 urges the pawl into the recess 85.

The pivoted end of the pawl 83 is at one end of the recess 84 and so disposed that the pawl may recede completely within the said recess 84 to permit the free rotation of the gear 80 upon the disk, and the recess 85 is provided at the extremity opposite the pawl, as at 87, with an abrupt shoulder adapted to engage the end of the pawl. With this construction it will be clear that, as seen in Fig. 17, the disk 79 may rotate counter-clockwise relative to the gear 80 without moving the latter gear, the disk 79 merely forcing the pawl 83 upwardly into the recess 84. Upon rotation in the opposite direction, however, as soon as the pawl 83 reaches the projection 87 it springs outwardly, thereby driving the gear 80 with the disk and thus moving the chain conveyor. By the above construction it will be clear that a pull on the handle 56 will wind up spring 76 and at the same time, through the medium of pawl 83, will rotate sprocket 62 of the conveyor. On release of the handle 56 the spring will retract or assist in retracting the handle. On this movement, however, the pawl 83 is released and the gear 80 does not return.

It is desirable to prevent the return of the rack 72 until its withdrawing movement has been completed. To this end a dog 90 is pivoted on a stud 91 carried by the plate 58. This dog has a tooth 92 adapted to project within and engage the teeth of the rack 72. The dog has an upwardly projecting arm 93 terminating in a pair of inclined cam surfaces 94 and 95 in position alternately to engage a leaf spring 96. This spring and the cam surfaces are so designed that if the tooth 92 be brought into engagement with the rack it will be held in such engagement by the spring 96 until the upwardly projecting arm 93 is forced over to the left as shown by the broken lines in Fig. 17, and if the dog be out of engagement with the tooth, it is held out of such engagement by the spring until the dog can be forcibly moved in the opposite direction.

Suitable pins 97 and 98 are arranged upon the rod 70 in position to engage the dog 90 at the extremes of travel of the rod. Thus when the rod is pulled out to the desired limit the pin 97 strikes the arm 93 and releases the tooth 92, permitting the rod 70 to be pushed back into the machine. As soon, however, as its retraction is complete, the pin 98 encounters the arm 93 and brings the tooth 92 again into engagement with the rack. Thereafter, by reason of the fact that the dog is pivoted below the line of travel of the rack, as shown in Fig. 17, it will act as a ratchet pawl readily slipping over the teeth of the rack during the outward movement, but instantly engaging the rack to prevent retrograde movement until the outward movement is complete and it is again released by the pin 97 as above described. The diameter of the gear 80 is preferably such that it makes one complete revolution for each complete withdrawal of the handle. Thus the pawl 83 will not again engage the projection 87 until retraction is complete.

The connection between the shaft 82 and the sprocket wheel 62 of the conveyor is such that the entire conveyor mechanism may be removed from the machine and replaced, and during this operation the connection comes readily out of and into mesh. The front shaft 60 projects from the side plate 50 to the right as seen in Fig. 9 and carries a sprocket wheel 104 (see also Figs. 28 and 29). The shaft 82 terminates at its inner end in an arm 105 (see also Fig. 18) carrying an eccentric pin 106 in the path of and in position to enter one of the recesses in the sprocket 104. When the conveyor frame is in place the shafts 60 and 82 are concentric and the former is driven by the latter to move the conveyor.

The arm 67 locks the plate in place in the machine, and it is released only upon insertion of a token of the proper character in the machine. The mechanism to accomplish this is as follows:

The shaft 78 of the gear 73 is journalled in the side plates 58 and 59, and carries on its outer end, beyond the plate 59 a pinion 141 which meshes with a quadrantal gear segment 142 (Fig. 26) mounted on a shaft 143 carried by the plates 58 and 59. This gear segment as shown in Fig. 26 is rigidly attached to and operates a box frame 144 which carries the token responsive mechanism.

Within the box frame (Fig. 25) are a pair of vertical guides 145 and 146 which guide vertical posts 147, 148 attached to a transverse plate 149 carrying a token identifying block 150. The block 150 carries a series of pins 151, (see Figs. 19, 23, 25 and 33) corresponding in position to the corresponding openings in the token 157 so that the pins 151 may be caused to project into the openings of tokens for which it is made and no others. To permit the free interchangeability of the parts and to permit the same serving chamber to respond to different tokens, the block 150 is dovetailed into the block 149, as seen in Fig. 19, and is retained in place by a pin 152 (Fig. 25) adapted to extend through an opening 153 in the block 150. The post 148 is provided with an axial bore which serves as a guide for the pin 152. The upper part of the bore is enlarged to serve as a housing for a spring 155 which at one end engages a shoulder 156 on the pin and at the other a hollow bushing 158 screwed into the upper end of the housing. A knob 160 upon the upper end of the pin 152 serves as a means to raise the pin 152 to release the block 150.

A channel shaped plate 161 is located in the box frame below the plate 149 and a slotted end plate 161a is secured to the end of plate 161. The slot in this end plate is alined with the token slot 57 when the box frame 144 occupies its normal position shown in Fig. 23. Grooves 161b in each side of the channel plate 161 provide guideways for engaging and supporting a token in space relation from the bottom of the channel plate.

A lever is journalled at 162 (Fig. 23) on the box frame 144. One arm 163 of this lever carries a pin 164 to which is attached a spring 165, the other end of the spring being attached to a pin 166. The other arm 167 of the lever is formed with a forwardly projecting finger 168 adapted to be engaged and displaced by a token 157 inserted in the channel plate 161. A second lever 170 also pivoted at 162 carries at one extremity the pin 166 and at the other is formed with a slot 172 adapted to engage a pin 173 on a post 174 carried by the block 149.

A pin 175 is carried by the lever 170 in position to be engaged by the lever arm 163 to limit the relative movement in response to the spring 165. A second spring 176 stretched between the pin 164 and a pin 177 on the box frame urges the lever arm 167 in clockwise direction as viewed in Figs. 23 and 24.

A bell crank lever 180 is pivoted on a pin 181 which is in axial alinement with the shaft 143 about which the box frame turns. This bell crank lever has one arm 182 in the path of the pin 173. The arm 182 has on one side a cam surface 183 adapted to be engaged by the pin as the pin descends, to rotate the lever 180 clockwise, and the other arm 185 of the lever 180 is in position to engage an arm 186 (see Fig. 20) of a bell crank lever 187 pivoted upon a bracket 188 carried by the plate 59. Operation of this lever unlocks the plate retaining arm 67 as will be described hereinafter.

The operation of this portion of the mechanism is as follows: When a token 157 is inserted in the slot, it pushes back the finger 168. If the token does not correspond to the plate 150, the plate 150 cannot descend and the token is ejected as soon as released. If it does correspond, however, the pins 151 enter the orifices in the token, permitting the pin 173 to descend, in response to the spring 165. This operates on the cam surface 183 to depress the arm 185 to release the article to be delivered. The pin 173 thereupon passes beneath the arm 182 and is held depressed by the spring 165. When the handle 56 is drawn outward it rotates the pinion 141 causing the box frame to rotate about the axis 143 to the position shown in Fig. 24. Here a stop 189 engages the end of the lever 170 causing withdrawal of the pins 151, and the token 157, thus released, is ejected into a chute 190 leading to a compartment in the drawer 36 due to the pressure of the finger 168 acting under propulsion of the spring 176.

To prevent the token from being inserted wrong end first, it is provided with a cam surface 192, (see Fig. 31) and there is provided in the channel plate 161, a dog 193 (Fig. 27) pivoted at 194 and pressed outwardly by a spring 195, into one of the grooves 161b, this outward movement being limited by a stop 196, to such a value that the cam surface 192 may cause the complete depression of the dog to permit the token to enter, but if the token be advanced with any other corner first the dog 192 will prevent its entrance.

The plate delivery mechanism is unlocked through the medium of a pin 197 which is mounted to slide in the plates 58 and 59. This pin is normally pressed outwardly by a spring 198, against a depending arm 199 of the lever 187. This pin (see Figs. 28, 29, 30) when depressed, lies in the path of an arm 200 of a lever 201. The lever 201 has an arm 202 formed with notch 202a in position to engage an arm 203 of a lever 204. Another arm 205 of the lever 201 has a W-shaped cam surface 206 in engagement with a spring 207 attached to one of the side plates 50. The depressions of the W are so spread that the spring will engage one depression to hold the lever 201 in position to free the lever 204 and will engage the other depression when in a position to lock the lever 204. A fourth arm 208 of the lever 201 lies in the path of the arm 203 when the lever 204 is swung inwardly, whereby the lever 201 may be swung into locking position by engagement of the arm 203 with the arm 208, as indicated by broken lins in Fig. 30, and thereafter if the arm 203 be raised it will snap into the notch 202a and can be released only by actuation of the pin 197.

The lever 204 is rigidly connected with the lever 68 so that the two rotate together. In addition to the forwardly extending arm 67, lever 68 has a rearwardly extending arm 211. At their free ends these arms are formed with upstanding lugs 212 and 213 respectively to engage the edge of a plate. These arms are so designed that when the arm 67 is pressed to one side sufficiently to permit the withdrawal of a plate, the other arm 211 is projected into the pathway of the following plate thus preventing the withdrawal of more than one plate at a time. A spring 214 is connected under tension between an arm 215 of the lever 204 and a pin 216 to normally urge the lever 68 to the position shown in Fig. 5 and by broken lines in Fig. 28, in which position the lever 204 is locked by the lever 201. In this position the insertion of a token will unlock the lever 204 and permit the removal of a plate.

A lever 218 pivoted at 219 (Figs. 28 and 29) in one of the side plates 50 carries the pin 216 in position to cause the spring 214 to urge the lever 218 clockwise as viewed in Fig. 28. This lever carries an upstanding lug 220 (see also Fig. 5) in the path of the plate. The lever 218 has an extension 221 in position to engage an arm 222 of a bell crank lever pivoted at 222a (Fig. 19). The other arm 223 of the bell crank lever engages a pin 224. (Figs 18, 20, 23 and 24) on a plate 225. This plate is mounted to slide vertically in ways 225a formed on the inner face of the casing to cover and uncover the token slot 57. The plate 225 is urged downwardly to slot causing position by a spring 226 extending between a pin 227 on the casing and a pin 228 on the plate. When the lever 218 is pressed outward the plate 225 is raised. Thus the token slot will remain closed at all times unless and until a plate is in a position to be removed from the machine.

The mechanism for controlling the annunciator lights and dials is shown in Figs. 11 to 15. It has been stated that the one light and dial is adapted to be restored manually in acknowledgment of the order. To this end there is provided, adjacent to the serving compartment at the server's end, a button 52 pivotally connected to an arm 231 of a lever 232 the other arm of which carries an insulated blade 233 adapted to enter between the forks 234—235 thereby forming a knife switch for connecting a pair of electric terminals 236 and 237. When the switch is closed across these terminals a circuit is established which operates to set back the annunciator dial 47. When the dial has been set back to zero the signal light 45 associated therewith is extinguished.

The other dial 48 of the annunciator is set back by the insertion of a plate in the serving compartment by means of the mechanism now to be described: A lever 240 is pivoted at 241 to one of the side plates 50 and is urged counter clockwise as seen in Fig. 11 by a spring 243. This lever carries a lug 66 (see also Fig. 5) in the path of the plate. A bell crank 245 is pivoted at 246 and has one arm 247 in position to be encountered by the extremity 248 of the lever 240 as it extends through an orifice 249 in the casing. The lever 245 has on its other arm 250, a dog 251 pivoted at 252. This dog is held against a pin 253 by a spring 253a. A lever 256 pivoted at 257 carries at its outer end an insulated blade 258 in position to enter between forks 259 and 260 to form a knife switch connecting terminals 261 and 262 which control a circuit operating the resetting of the dial 48. When the latter dial is restored to zero the signal light 46 associated therewith is extinguished. The dog 251 has an arm 254 adapted to engage, depress and then pass a lug 264 formed on the lever 256. The lever 250 is urged clockwise (Figs. 11 and 12) by a spring 265 and the lever 256 is urged to open position by a spring 266. The construction is such that when a plate is inserted in the serving mechanism, its encounter with the lug 66 will rotate lever 250 to close switch 258. However, the levers 250 and 256 are not concentric so that the arm 254 may slip off the lug 264 as the rotation continues, permitting the circuit to be opened by the spring 266. When the lever 250 is restored the dog arm 254 slips under the lug 264 as shown by the broken lines in Fig. 12.

Means are provided for adjusting the tension of the conveyer chains, comprising blocks 280 (Figs. 11 and 14) in which the rear sprocket shaft 61 is journalled, which blocks slide in grooves 281 in the conveyor side frames 59, being held in adjustment by screws 282 moving in slots 283. An adjusting screw 284 operates in a nut 285 carried by the conveyor frame and bears against the blocks 280. By this construction the blocks 280 may be moved by the screws to tighten the chain.

The annunciator may be of any suitable form and the interior construction may be such as that shown somewhat schematically in Fig. 34. The dials 47 and 48 are mounted to turn freely on a fixed shaft or stud 300 supported in the frame of the annunciator. Secured to the face of the dial 47 are a cam 301 and a ratchet wheel 302. Mounted on the stud 300 is a bell crank lever 303, one arm of which is freely connected to a vertical rod 304 while the other arm carries a ratchet pawl 305 pivoted thereon. Normally the rod 304 is held in raised position by a spring 306 and when in this position a projection 307 of the pawl 305 engages a pin 308 which lifts the pawl out of engagement with the teeth of the ratchet wheel 302. When, however, the rod 304 is drawn downward against the action of spring 306 the pawl is moved out of engagement with the pin 308 and is brought into engagement with a tooth of the ratchet wheel 302 by means of a tension spring 309. The parts are so arranged that on each downward pull of the rod 304, the ratchet wheel is moved through the space of one tooth and the dial 47 is advanced through a corresponding angle.

Similarly the dial 48 has secured thereto a cam 311 and a ratchet wheel 312, the latter being operated by a pawl 315 pivotally mounted on one arm of a bell crank 313, the other arm of which is freely connected to the rod 304. A spring 319 urges the pawl into engagement with the ratchet, but the pawl is normally held out of such engagement by a pin 318 engaging a projection 317 of the pawl. Thus at each operation of the rod 304 both dials will be moved forward through the space of one ratchet tooth. The dials 47 and 48 are preferably of drum shape bearing numbers on their peripheries, the numbers on each drum running serially from zero and having the same angular spacing as have the teeth of the ratchet wheels 302 and 312. The casing of the annunciator has an aperture 310 (Fig. 3) therein for each drum, through which is displayed a single number of the drum at a time.

A spiral spring 320 connected at one end to the stud 300 and at the other to the drum 47, is placed under tension as the drum 47 is advanced by the pawl 305, and to prevent the drum from returning under the impulse of the spring when the pawl 305 is lifted clear of the ratchet 302 I provide an escapement 321 which normally holds the ratchet wheel against rearward movement and which, when operated, permits the ratchet to turn back through an angle of one tooth. The escapement 321 is pivoted on a stud 325 and carries an arm 326 freely connected to an operating rod 327.

Similarly the dial 48 is provided with a spiral spring 320' which resists forward movement and with an escapement 321' which is of the same form and operates in the same manner as the escapement 321 to control the return movement of the dial. The escapement 321' is connected to an operating rod 327'.

The rod 304 is provided at its lower end with an armature 328 which may be actuated by an electro-magnet 329 to draw down the rod 304 and operate the dials 47 and 48 simultaneously. On the other hand, the escapements 321 and 321' are separately operated by electro-magnets 330 and 330' which attract armatures 331 and 331' connected respectively to the operating rods 327 and 327'. Thus whenever either of the magnets 330 or 330' is operated the dial controlled thereby will be stepped back through a space of one tooth under impulse of the coil spring associated with that particular dial. The magnet 329 is energized whenever a corresponding key *a* in the token-delivering machine is depressed. In the diagram the key *a* is represented as a switch which, when closed, completes a circuit of the battery E through the magnet 329.

In the diagram the dials are shown at their zero position in which position an arm 332 of a contact lever 333 enters a depression in the cam 301 being held in engagement therewith by a tension spring 334. The lever 332 carries a blade 335 insulated therefrom. As soon as the dial 47 is moved away from zero position the arm 332 is swung outward by the cam 301 and the blade 335 is pressed between a pair of forked terminals 336 and 337, thereby closing a circuit from the battery E through the signal lamp 45. Similarly the dial 48 is provided with a lever 333' bearing a blade 335' and having an arm 332' which is held in engagement with the surface of the cam 311 by spring 334', and when the cam 311 is advanced out of the zero position, the arm 332' is swung upward, closing a circuit from the battery E through a pair of forked terminals 336' and 337' and thereby energizing the lamp 46. Thus the lamps 45 and 46 will remain lighted as long as the dials 47 and 48 are not in zero position. As explained above the dial 47 is adapted to be set back manually by operation of the push button 52 and when the push button is depressed the blade 233 engages the spring contact members 234 and 235 of the terminals 236 and 237. When these terminals are thus bridged a circuit is closed which includes the battery E and the electro-magnet 330. Thus at each operation of the push button 52 the escapement 321 will be actuated to operate the ratchet 302, permitting the dial 47 to turn back through the space of one tooth. When the dial has been set back to zero position the light 45 will be extinguished by coaction of arm 332 with the depression in cam 301 under impulse of spring 334.

The dial 48 is stepped back whenever a plate is inserted in the serving compartment 41. As each plate is introduced in the passageway it encounters and pushes back the finger 66 which, through the mechanism described above operates to swing the blade 258 momentarily into contact with the contact members 259 and 260. When the terminals 261 and 262 are thus bridged a circuit is complete which includes the battery E and the electromagnet 330', the latter then operates the escapement 321' to release the ratchet 312 and permit the dial 48 to be stepped back by the spiral spring 320' through the space of one tooth. When the dial 48 has been restored to zero position, the circuit of the lamp 46 will be broken by disengagement of the switch blade 335' from the contact leads 336' and 337' through coaction of arm 332' with the depression in cam 311 under the impulse of spring 334'.

So far I have described the construction of a single serving compartment and its associated mechanism. As explained above my improved serving machine is arranged to contain a large number of compartments of the character above described. In the particular embodiment of my invention here illustrated (see Figs. 2 and 3) the compartments are arranged in three groups, each containing six tiers of compartments. Obviously, the particular number and arrangement shown is not intended as a limitation of the capacity of the serving machine. Each compartment constitutes a complete unit of standard form which may be withdrawn from the machine and replaced with another whenever so desired The token actuated mechanism for each compartment also consists of a separate unit of standard dimensions which is removable and replaceable.

The construction of the main frame and the main casing in which these compartments are supported is shown particularly in Figs. 4, 5, 8, 9, and 10. In the base portion of the machine is a framework preferably built up of channel iron and including a pair of main beams 400 extending from front to rear of the machine. On the beams 400 are supported transverse beams 401 and 402 which extend from one side to the other of the machine. Secured to and rising from the beams 401 and 402 are vertical plates 403 and 404 which are arranged in pairs between the vertical rows of compartments as shown in Fig. 9. These plates are suitably spaced apart by means of sleeves 405 supported on rods 406 which pass from one side of the machine to the other. Secured to the plates 403 and 404 are rails 407 which extend from front to rear of the machine and provide supports for compartment casings 409 in which the serving compartments are respectively located. On the floor of each casing 409 is a pair of channel shaped rails 410. The latter serve as tracks in which the plates 50 which carry the conveyor are adapted to slide. The rails 410 are provided at their rear ends with pins 411 (Fig. 7) which engage openings in the floor of the casing 409, being thus held against endwise movement in the casing.

The main casing of the machine is provided at the forward end with panels 412 which are adapted to swing on hinges 413 carried by the members 407. Vertical strips 414 are secured by brackets 415 to the members 407 and between these strips and the free ends of the panels are plates 416 which form the outer end walls of the token receiving mechanism. However, the panels are provided with cleat strips 417 which overlap the plates 416.

Before opening a panel 412 all of the adjacent handles 56 must be pulled out so as to clear the edge of the panel. Then on opening the panel access may be had to all of the compartments of that row. The casings 409 may be removed individually with the conveyor mechanism associated therewith. Thus access may be had to the mechanism of any unit for purposes of repair or replacement when desired.

To lock the panel shut I provide a plurality of latch levers 420 (see Fig. 4) which are pivotally mounted on the rails 407. Each latch lever, at its forward end, is formed with a tooth adapted to engage a notched lug 421 secured to the panel 412. The opposite ends of the latch levers have pin and slot connection with a vertical tie bar 422. The rear ends of the latch levers are individually drawn upward by springs 423 so that they are normally held in locking engagement with the lugs 421. A spring 424 secured at one end to the bar 422 and at the other to the plate 403 serves also to urge the tie bar upward. The lower end of the tie bar is freely connected to the rear end of a lever 425 which is pivotally supported on a bracket 426 secured to one of the rails 407. The forward end of the lever 425 engages a cam 427. The cam may be turned from the outside of the machine through suitable lock mechanism operated by a key inserted in the key slot 428 (Fig. 2). The cam when thus turned will raise the forward end of the lever 425, thereby depressing the tie bar 422 and swinging all of the levers 420 clear of the lugs 421.

All the tokens deposited in the token slots of a vertical row of units are collected in a single drawer 36 which is divided by transverse partitions into separate compartments, there being one compartment for each unit. The chutes 190 leading from the various units are arranged as shown in Fig. 4 so as to lead into the compartments in the drawer 36. The chutes 190 are not connected to the token actuated mechanisms, but are independently supported by means of cleats 430, secured to the frame of the machine. Thus the token mechanisms may be individually drawn out of the machine without disturbing their connection with the token chutes.

At the rear of the machine panels 431 are provided which are hinged to the members 407. Each panel carries a vertical strip 432 which overlaps the hinged edge of the next adjacent panel. These panels are locked by means similar to that used in the connection with the front panels. Each panel 431 carries a number of notched lugs 433 (Fig. 4) which are engaged by latch levers 434 and the latter are tied together at their opposite ends by means of a tie bar 435. At its lower end the tie bar 435 is connected to one end of a lever 436, the other end of which engages a cam 437. The latter may be turned from the outside of the machine by means of suitable lock mechanism controlled by a key introduced into the key slot 438. Normally the bar 435 is held in raised position by a spring 439 acting on the lever 436, and the latch levers are thus held in locking engagement with the lugs 433, but when the cam 437 is turned, it rocks the lever 436 on its axis depressing the bar 435 and releasing the latch levers 434 from engagement with the lugs, thus permitting the panel to be swung open. It will be understood that panels 431 are provided with openings to clear the buttons 52.

While the operation of my machine has already been explained in connection with the detailed description of the various mechanisms the following résumé will no doubt be found useful:

A customer or a waiter places an order at the cashier's desk and the cashier immediately depresses a corresponding key $a$ for each different kind of commodity ordered. As each key is depressed a corresponding token is uttered from the magazine $b$ and held inaccessible in a suitable compartment. As soon as the order has been paid for the cashier operates the lever $d$ which releases the tokens uttered and delivers them into the receptacle $e$.

At each depression of a key an annunciator corresponding to the key is actuated at the serving station. Each annunciator has two similar dials both of which are simultaneously actuated by the depression of the corresponding key $a$ to indicate that a commodity represented by that particular key and annunciator has been ordered. Simultaneously with the initial actuation of the annunciator dials the lamps 45 and 46 are lighted by coaction of the switch levers 333 and 333′ with the cams 301 and 311 respectively. If two or more commodities of the same kind are ordered the cashier depresses the same key a corresponding number of times and the dials 47 and 48 of the corresponding annunciator will be operated by each actuation of the key $a$ to indicate the total number of orders of that commodity. The server on seeing the signal lights 45 and 46 is notified that an item called for by the annunciator carrying those lights has been ordered. He will then acknowledge the order by depressing the key 52 to step back the dial 47. If, for instance, there were three orders placed for the same item, he would depress the button 52 three times, setting back the dial to zero and extinguishing the light 45. The purpose of this arrangement is to avert confusion on the part of the server should he receive another order for the same commodity while filling the orders previously given. In other words, on returning to the serving machine with the commodities ordered, he could tell at a glance whether a new order had been received for the same commodity.

The server fills the orders as received, the orders being placed on plates of standard size, and these are introduced into the proper compartments through the openings in the rear panels 431. As the plates are passed through these openings and placed on the conveyor they encounter the spring fingers 66 which are pushed laterally by the insertion of the plate and operate to close the circuit of the magnet 330'. The latter thereupon actuates the escapement 321' to permit the dial 48 to be stepped back one number for each plate inserted. When all the orders for that particular commodity have been filled the dial 48 is returned to zero position and the lamp 46 is extinguished.

In the meantime the customer or waiter, having received a token for each commodity he has ordered, goes to the forward end of the machine and inserts the tokens in the proper token slots. He is guided in the selection of the proper token slot by the name and number of the item stamped on the token and the corresponding name and number in the label 55 of the corresponding compartment. It is probable that he will find the token slots closed because the plates 225 in their normal position cover the slots and not until a plate is in position for delivery is the corresponding token slot open. Usually some time must be allowed for preparation of the commodity ordered. Even after the order has been filled the token slot will not be open until the plate bearing the commodity has reached the delivery point. The compartments are long enough to accommodate a number of plates, and when the server introduces a plate into the compartment he may push ahead previously inserted plates so that the forward plate will reach the delivery point. Otherwise the customer must draw the plate forward to the delivery point. The customer can look into the compartment to see whether it contains a plate and then by repeatedly pulling the handle 56 he will cause the conveyor to carry the plate to the delivery point. Each complete forward stroke of the handle will cause the conveyor to advance a distance equal to the diameter of a plate. This advance of the conveyor is effected through racks 72 (see Fig. 17), pinion 74, gears 73 and 80, pinion 81, eccentric pin 106 (Fig. 19), and sprocket 104 on the forward shaft 60 of the conveyor.

When the plate reaches the delivery end of the compartment it is locked against further movement by the lug 212 on the lever arm 67, and further operation of the handle 56 will result merely in sliding the conveyor under the plate until the arm 67 has been unlocked. Just before the plate reaches the delivery end of the compartment it presses the lug 220 (Figs. 28 and 29) outward, and the lever 218 which carries the lug strikes the bell crank arm 222 lifting the plate 225 to clear the token slot.

The customer may now insert the token and, as he introduces it into the slot, it pushes against the spring-pressed finger 168. If the token is introduced into the wrong slot, it will, as soon as it is released, be ejected by said finger. If, on the other hand, the token is inserted in the proper slot the pins 151, on finding corresponding holes in the token, will enter these holes and lock the token against ejection. As the pins 151 and a block 150 to which they are attached move downward the pin 173 strikes the arm 182 of the bell crank lever 180 which in turn, operating through the bell crank lever 187, presses the pin 197 (Figs. 28 and 30) against the locking lever 201, causing said lever to release the arm 203 and free the arm 67 so that the plate may be withdrawn. As soon as this occurs the operator may draw out the handle 56 again to feed the plate out of the compartment. As the plate is drawn out of the compartment the arm 211 swings forward into the path of the next succeeding plate so that not more than one plate can be removed by the customer at a single insertion of a token. The depression of the pin 197 is momentary and as the plate is drawn out past the arm 67 the locking lever 201 is swung back to normal position by engagement of the arm 203 with the arm 208. As soon as the plate has cleared the lug 212 the arm 67 springs back to its normal position under impulse of spring 214 and is then locked in said position by engagement of the arm 202 with the notch 202a of the locking lever. The token receiving mechanism which is carried by the box frame 144 is swung through an angle of 90 degrees about the pivot 143 at each outward pull of the handle 56 and as it reaches the position shown in Fig. 24 the pin block 150 is withdrawn by engagement of the arm 170 with the stop 189, thereby drawing the pins out of engagement with the token, if there be one in the token slide, so that the token is now ejected by the finger 168 and falls into the chute 190 which delivers it to the proper compartment in the token drawer 36.

While I have described an apparatus which carries out the objects of my invention I do not limit myself to the exact details shown. It will be understood, of course, that many variations can be made in the structure and arrangements of various parts, and I consider myself at liberty to make such alterations, variations and modifications as fall within the spirit and scope of the appended claims.

I claim:

1. In a commodity-dispensing apparatus, a chamber through which a commodity is to be delivered, a gate normally preventing removal of the commodity from the delivery end of the chamber, a latch adapted to lock the gate in normal position, token-actuated means for releasing said latch, and means actuated by removal of the commodity from the delivery end for resetting the latch in locking position.

2. In a commodity-dispensing apparatus, a chamber through which a commodity is to be delivered, a gate serving in closed position to prevent withdrawal of the commodity from the delivery end of the chamber, a latch for locking the gate in closed position, token-actuated means for releasing the latch to permit the gate to be opened, a spring adapted to return the gate to closed position, and means operated by opening of the gate to reset the latch, whereby the gate will be locked when it is returned to closed position.

3. In a commodity-dispensing apparatus, a chamber adapted to receive a plurality of commodities, a gate permitting removal of one commodity at a time from the chamber, a latch normally holding the gate in locked position, token-actuated means for releasing said latch, and means actuated by removal of said commodity from the chamber for resetting the latch.

4. In a commodity-dispensing apparatus, a chamber for receiving a commodity, a detent for preventing withdrawal of the commodity from the chamber, a token receiver for receiving a commodity-identifying token, identifying means cooperating with the token to retain the token in the receiver and release said detent, means for moving the token receiver, a depository, means for automatically withdrawing the identifying means when the receiver has been moved to a pre-determined position to deposit the token in the depository.

5. In a commodity-dispensing apparatus, a chamber for receiving a commodity, a detent for preventing withdrawal of the commodity from the chamber, a token receiver for receiving a commodity-identifying token, resilient means tending to eject the token, identifying means urged by said resilient means into engagement with the token and operating to retain a token identified thereby, means actuated by operation of the identifying means for releasing the detent, means for moving the receiver, a depository, and means for automatically withdrawing the identifying means when the receiver has been moved to a pre-determined position whereby said resilient means will eject the token into the depository.

6. In a commodity-dispensing apparatus, a chamber adapted to receive a commodity, a detent for preventing withdrawal of the commodity from the chamber, a token receiver mounted to reciprocate between a receiving position and a depositing position, means actuated by insertion of a token in the receiver for releasing the detent, means for reciprocating the receiver, and means for preventing reversal of movement of the receiver except at the end of a stroke thereof.

7. In a commodity-dispensing apparatus, a conveyor for conveying a commodity to a delivery point, a detent at the delivery point for detaining the commodity, a token receiver, means actuated by insertion of a token in the receiver for releasing the detent, means for advancing the conveyor intermittently and simultaneously reciprocating the receiver between a token-receiving position and a token-depositing position, and a depository to receive the token on movement of the receiver to the depositing position.

8. In a commodity-dispensing apparatus, a conveyor for conveying a commodity to a delivery point, a detent at the delivery point for detaining the commodity, a token receiver, means actuated by insertion of a token in the receiver for releasing the detent, means for advancing the conveyor intermittently and simultaneously reciprocating the receiver between a token-receiving position and a token-depositing position, a depository, and means operable automatically for ejecting the token from the receiver into the depository when the receiver has reached the depositing position.

9. In a commodity dispensing apparatus, a chamber having an inlet opening at one end and a delivery opening at the other end, a conveyor on which the commodity may be rested, means for operating the conveyor to move the commodity by frictional engagement therewith from the inlet opening to and through the delivery opening, a detent normally barring passage of the commodity through the delivery opening, and token actuated means for releasing said detent.

10. In a commodity dispensing apparatus, a chamber having an inlet opening at one end and a delivery opening at the other end, a conveyor on which the commodity may be rested, means for operating the conveyor to move the commodity by frictional engagement therewith from the inlet opening to and through the delivery opening, a detent normally barring passage of the commodity through the delivery opening, token actuated means for releasing said detent, and means associated with the detent for barring a succeeding commodity on the conveyor while the detent is released.

11. In a commodity dispensing apparatus, a chamber having an inlet opening at one end and a delivery opening at the other end, a conveyor on which the commodity may be rested, means for operating the conveyor to move the commodity by frictional engagement therewith from the inlet opening to and through the delivery opening, a detent normally barring passage of the commodity through the delivery opening, token actuated means for withdrawing said detent, and means for preventing operation of the token actuated means unless there be a commodity at the delivery end of the chamber.

12. In an apparatus for dispensing dishes, a chamber having an inlet opening at one end and a delivery opening at the other end, a conveyor on which the dishes may be rested, means for operating the conveyor to move the dishes from one end of the chamber to the other, guide rails at each side of the chamber overlapping opposite edges of the dishes, a detent normally barring delivery of a dish through the delivery opening, and token actuated means for releasing said detent.

13. In an apparatus for dispensing dishes, a chamber having an inlet opening at one end and a delivery opening at the other end, a conveyor on which the dishes may be rested, means for operating the conveyor to move the dishes from one end of the chamber to the other, guide rails at each side of the chamber overlapping opposite edges of the dishes, a detent normally barring delivery of a dish through the delivery opening, token actuated means for releasing said detent, and means associated with the detent for barring a succeeding dish on the conveyor while the detent is released.

14. In an apparatus for dispensing dishes, a chamber having an inlet opening at one end and a delivery opening at the other end, a conveyor on which the dishes may be rested, means for operating the conveyor to move the dishes from one end of the chamber to the other, guide rails at each side of the chamber overlapping opposite edges of the dishes, a detent normally barring passage of a dish through the delivery opening, token actuated means for releasing said detent, and means for preventing operation of the token actuated means unless there be a commodity at the delivery end of the chamber.

Signed at New York in the county of New York and State of New York this 6th day of July A. D. 1927.

HARRY RUSSELL BRAND.